United States Patent
Tan et al.

(10) Patent No.: US 11,972,109 B2
(45) Date of Patent: Apr. 30, 2024

(54) TWO-STAGE BUFFER OPERATIONS SUPPORTING WRITE COMMANDS

(71) Applicant: Micron Technology, Inc., Boise, ID (US)

(72) Inventors: Hua Tan, Shanghai (CN); Lingye Zhou, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 255 days.

(21) Appl. No.: 17/283,495

(22) PCT Filed: Mar. 1, 2021

(86) PCT No.: PCT/CN2021/078387
§ 371 (c)(1),
(2) Date: Apr. 7, 2021

(87) PCT Pub. No.: WO2022/183308
PCT Pub. Date: Sep. 9, 2022

(65) Prior Publication Data
US 2023/0107227 A1    Apr. 6, 2023

(51) Int. Cl.
*G06F 3/06* (2006.01)

(52) U.S. Cl.
CPC .......... *G06F 3/0613* (2013.01); *G06F 3/0656* (2013.01); *G06F 3/0673* (2013.01)

(58) Field of Classification Search
CPC ..... G06F 3/0613; G06F 3/0656; G06F 3/0673
See application file for complete search history.

(56) References Cited

U.S. PATENT DOCUMENTS

| | | | |
|---|---|---|---|
| 2002/0049746 A1 | 4/2002 | De Roose | |
| 2014/0189207 A1* | 7/2014 | Sinclair | G06F 12/0246 711/103 |

(Continued)

FOREIGN PATENT DOCUMENTS

| | | |
|---|---|---|
| CN | 106951181 A | 7/2017 |
| CN | 108874701 A | 11/2018 |

(Continued)

OTHER PUBLICATIONS

"International Search Report and Written Opinion of the International Searching Authority," issued in connection with Int'l Appl. No. PCT/CN21/078387, dated Nov. 24, 2021 (8 pages).

*Primary Examiner* — Michael Krofcheck
*Assistant Examiner* — Janice M. Girouard
(74) *Attorney, Agent, or Firm* — Holland & Hart LLP

(57) ABSTRACT

Methods, systems, and devices for two-stage buffer operations supporting write commands are described. If data is written to a memory device starting at a multi-plane page offset other than zero, the read performance for the data may decrease significantly due to die misalignment. To avoid die misalignment, a memory system may support two buffers for write data: a flush buffer and a temporary buffer. The memory system may determine whether to add received data to the flush buffer, the temporary buffer, or a combination thereof based on a data transfer size and a threshold size. If the data in the temporary buffer satisfies a copy condition, the data in the temporary buffer is copied into the flush buffer. If the data in the flush buffer satisfies a flush condition, the data in the flush buffer is written to the memory device starting at a multi-plane page offset of zero.

20 Claims, 7 Drawing Sheets

(56) References Cited

U.S. PATENT DOCUMENTS

| | | |
|---|---|---|
| 2018/0349035 A1 | 12/2018 | Ellis et al. |
| 2019/0004715 A1* | 1/2019 | Trika .................... G06F 3/0652 |
| 2019/0294381 A1 | 9/2019 | Yang et al. |
| 2022/0334769 A1* | 10/2022 | Kim ..................... G06F 3/0625 |

FOREIGN PATENT DOCUMENTS

| | | |
|---|---|---|
| CN | 108984429 A | 12/2018 |
| EP | 1193962 A1 | 4/2002 |

* cited by examiner

300

TWO-STAGE BUFFER OPERATIONS SUPPORTING WRITE COMMANDS

CROSS REFERENCE

The present Application for Patent is a 371 national phase filing of International Patent Application No. PCT/CN2021/078387 by TAN et al., entitled "TWO-STAGE BUFFER OPERATIONS SUPPORTING WRITE COMMANDS," filed Mar. 1, 2021, assigned to the assignee hereof, and expressly incorporated by reference herein.

FIELD OF TECHNOLOGY

The following relates generally to one or more systems for memory and more specifically to two-stage buffer operations supporting write commands.

BACKGROUND

Memory devices are widely used to store information in various electronic devices such as computers, user devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Figure 1:
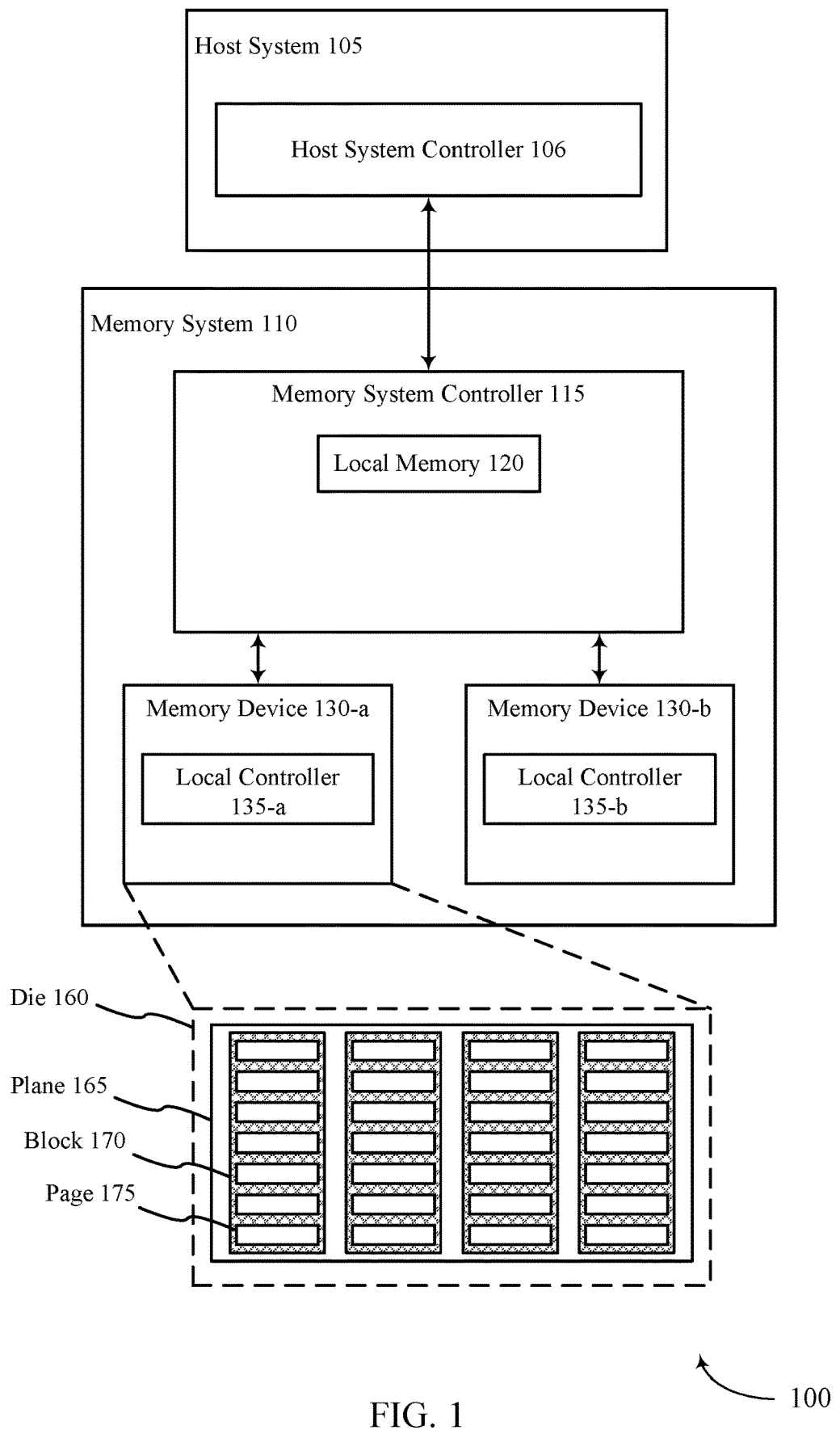
FIGS. 1 and 2 illustrate examples of systems that support two-stage buffer operations supporting write commands in accordance with examples as disclosed herein.

Some memory devices, such as not-and (NAND) memory devices, solid-state drives (SSDs), or other memory devices, may store data using multi-plane pages. For example, a memory die may include a quantity of planes (e.g., two or four planes), and a memory system may perform access operation, such as read and write operations, in parallel across one or more planes for a physical page. A same physical page spanning a set of multiple planes may be referred to as a multi-plane page. The multi-plane page may support multiple offsets at which data may be written based on or in response to the multi-plane page size, or a minimum threshold size for reading or writing data, or both. For example, if the minimum threshold size for reading or writing data (or both) is 4 kilobytes (kB) and the multi-plane page size is 64 kB (e.g., for a 16 kB physical page across four planes), the multi-plane page size may support 16 offsets for reading and writing data within the multi-plane page.

A memory system may efficiently read data written to a memory device starting at a multi-plane page offset of zero. If data is written to a memory die with a start logical block address (LBA) at a multi-plane page offset of zero, the configuration may be referred to as "die alignment" or being "die aligned." In such a configuration, the memory system may perform a single read operation to read the data starting from the offset of zero (e.g., to read the data for the multi-plane page) and may leverage a cache read operation to further improve the read performance. However, if data is written to the memory die with a start LBA at a multi-plane page offset other than zero, the configuration may be referred to as "die misalignment" or being "die misaligned." In such a configuration, the memory system may perform two read operations to read the data from the correct LBA of the multi-plane page (e.g., one read operation to read the multi-plane page and one read operation to read the correct data starting at the non-zero offset for the multi-plane page) and may not support cache read operations. As such, as compared to a die-alignment configuration, a die-misalignment configuration may result in inefficient read operations due to increased read latency and processing overhead, among other disadvantages. Furthermore, the negative effects of die misalignment may be especially significant for read operations performed on relatively large data files (e.g., data files spanning multiple multi-plane pages) due to the relatively large quantity of read operations performed for reading relatively large data files across multiple multi-plane pages.

To support a mitigation of die misalignment, a memory system may implement two-stage buffer operations for write commands. The two-stage buffer operations may implement a first buffer—which in some cases may be referred to as a flush buffer—and a second buffer—which in some cases may be referred to as a temporary buffer. If the memory system receives a command to write data to a memory device, the memory system may determine whether to add the data to the first buffer, the second buffer, or a combination thereof (e.g., add a portion of the data to the first buffer and a portion of the data to the second buffer) based on or in response to the data transfer size, or a threshold size, or both. For example, if the data transfer size is less than the threshold size, the memory system may add data smaller than the threshold size to the second buffer. If the data transfer size is greater than or equal to the threshold size, the memory system may add one or more portions of the data of the threshold size to the first buffer and may add one or more other portions of the data, such as any remaining data (e.g., less than the threshold size), to the second buffer. If the data stored in the second buffer satisfies a copy threshold, which may be equal to the threshold size in some examples, the data may be copied to the first buffer. Accordingly, data may be added to the first buffer in chunks equal to the threshold size (or a multiple of the threshold size). If the data stored in the first buffer satisfies a flush threshold, the memory system may write the data from the first buffer to the memory device. By setting the threshold size equal to the multi-plane page size of the memory device, the memory system may ensure that data written to the memory device from the first buffer starts at a multi-plane page offset of zero, avoiding die misalignment and supporting improved read performance (e.g., compared to die misaligned data).

Features of the disclosure are initially described in the context of systems and devices as described with reference to FIGS. 1 and 2. Additionally, features of the disclosure are described in the context of data flows and process flows as described with reference to FIGS. 3 through 5. These and other features of the disclosure are further illustrated by and described with reference to an apparatus diagram and a flowchart that relate to two-stage buffer operations supporting write commands as described with reference to FIGS. 6 and 7.

FIG. 1 illustrates an example of a system 100 that supports two-stage buffer operations supporting write commands in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA)controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-*a* and 130-*b* are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or any combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some examples, a memory device 130 may operate using or according to virtual blocks and virtual pages. A virtual block may correspond to one block 170 of each plane 165 and each NAND die 160. Each virtual block may include multiple virtual pages. In some cases, multiple virtual pages may correspond to a physical page 175 (e.g., four virtual pages per physical page 175). In some examples, a virtual block may include tens of thousands of virtual pages (e.g., depending on the size of the memory device 130). The memory device 130 may perform read and write operations according to the virtual blocks and virtual pages. In some examples, one or more virtual pages, virtual blocks, pages 175, blocks 170, or memory devices 130 may be referred to as a "partition" or a "subset" of a memory system 110.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, performing concurrent operations in different planes 165 may be subject to one or more restrictions, such as identical operations being performed on memory cells within different pages 175 that have the same page address within their respective planes 165 (e.g., related to command decoding, page address decoding circuitry, or other circuitry being shared across planes 165).

For example, the host system 105 may read data from and write data to a page 175 across multiple planes 165 of a memory die 160. The page 175 across the multiple planes 165, which may be referred to as a multi-plane page, may include multiple offsets at which data may be written and read. Each offset may correspond to a smallest unit of data supported by the memory device 130. For example, the host system 105 may support a minimum data size for reading and writing data (e.g., 4 kB for universal flash storage (UFS), 512 bytes (B) for embedded multiMediaCard (eMMC)). A multi-plane page of the memory device 130 may be divided into multiple offsets of the minimum data size, such that data may be written to the multi-plane page starting at any offset and, correspondingly, may be read from the multi-plane page starting at any offset.

In some examples, a memory device 130 (e.g., a NAND flash device) may include a physical page size of 16 kB. The memory device 130 may support parallel read and write operations across different planes 165 of a memory die 160 (e.g., two or four planes). Accordingly, the multi-plane page size of the memory device 130 may be 32 kB for a two-plane NAND die 160 or 64 kB for a four-plane NAND die 160. However, other page sizes and quantities of planes may be supported by the system 100. If the minimum data read and write size is 4 kB, and the multi-plane physical page size is 64 kB, the multi-plane page may include 16 units for reading and writing data of the minimum size (e.g., each unit is one user data size of 16 kB). Accordingly, the multi-plane page may support 16 possible offsets. If the host system 105 writes data to a multi-plane page of a memory die 160 starting at offset zero, the write operation may result in die alignment. However, if the host system 105 writes data to a multi-plane page of the memory die 160 starting at an offset other than zero (e.g., one through fifteen), the write operation may result in die misalignment. The system 100 may support one or more techniques to avoid die misalignment. For example, the system 100 may support two-stage buffer operations for write commands to ensure that data is written to a multi-plane page of a memory die 160 starting at an offset of zero.

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

The system 100 may include any quantity of non-transitory computer readable media that support two-stage buffer operations supporting write commands. For example, the host system 105, the memory system controller 115, or a memory device 130 may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

Although the features of the disclosure are described herein with reference to NAND memory devices 130, it is to be understood that the features of the disclosure may be implemented with other memory devices 130 or memory systems 110. For example, one or more features of the disclosure described herein may be implemented in non-volatile memory or other memory devices 130, such as an SSD memory device.

Figure 2:
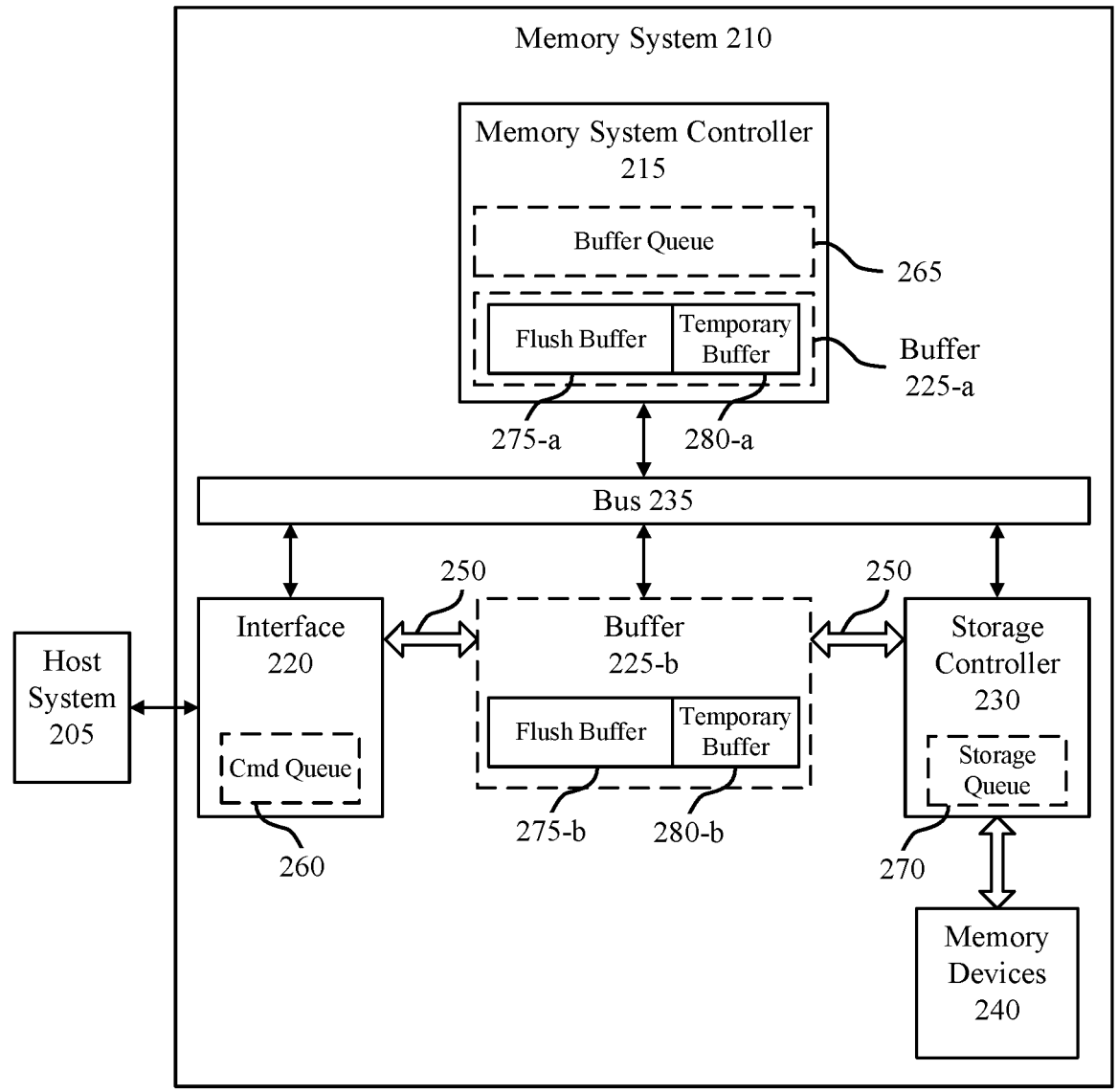

FIG. 2 illustrates an example of a system 200 that supports two-stage buffer operations supporting write commands in accordance with examples as disclosed herein. The system 200 may be an example of a system 100 as described with reference to FIG. 1 or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include memory devices 240 to store data transferred between the memory system 210 and the host system 205, e.g., in response to receiving access commands from the host system 205, as described herein. The memory devices 240 may include one or more memory devices as described with reference to FIG. 1. For example, the memory devices 240 may include NAND memory, PCM, self-selecting memory, 3-dimensional (3D) cross point, other chalcogenide-based memories, FERAM, MRAM, NOR (e.g., NOR flash) memory, STT-MRAM, CBRAM, RRAM, OxRAM, or SSDs.

The memory system 210 may include a storage controller 230 for controlling the passing of data directly to and from the memory devices 240, e.g., for storing data, retrieving data, and determining memory locations in which to store data and from which to retrieve data. The storage controller 230 may communicate with memory devices 240 directly or via a bus (not shown) using a protocol specific to each type of memory device 240. In some cases, a single storage controller 230 may be used to control multiple memory devices 240 of the same or different types. In some cases, the memory system 210 may include multiple storage controllers 230, e.g., a different storage controller 230 for each type of memory device 240. In some cases, a storage controller 230 may implement aspects of a local controller 135 as described with reference to FIG. 1.

The memory system 210 may additionally include an interface 220 for communication with the host system 205 and a buffer 225 for temporary storage of data being transferred between the host system 205 and the memory devices 240. In some examples, the interface 220, buffer 225, and storage controller 230 may be for translating data between the host system 205 and the memory devices 240, e.g., as shown by a data path 250, and may be collectively referred to as data path components. In some systems (e.g., for managed NAND), a buffer 225-a may be a component of a memory system controller 215. In some other systems (e.g., for SSD), a buffer 225-b may be separate from the memory system controller 215.

Using a buffer 225 to temporarily store data during transfers may allow data to be buffered as commands are being processed, thereby reducing latency between commands and allowing arbitrary data sizes associated with commands. This may also allow bursts of commands to be handled, and the buffered data may be stored or transmitted (or both) once a burst has stopped. The buffer 225 may include relatively fast memory (e.g., some types of volatile memory, such as SRAM or DRAM) or hardware accelerators or both to allow fast storage and retrieval of data to and from the buffer 225. The buffer 225 may include data path switching components for bi-directional data transfer between the buffer 225 and other components.

In some cases, the temporary storage of data within a buffer 225 may refer to the storage of data in the buffer 225 during the execution of access commands. That is, upon completion of an access command, the associated data may no longer be maintained in the buffer 225 (e.g., may be overwritten with data for additional access commands). In addition, the buffer 225 may be a non-cache buffer. That is, data may not be read directly from the buffer 225 by the host system 205. For example, read commands may be added to a queue without an operation to match the address to addresses already in the buffer 225 (e.g., without a cache address match or lookup operation).

The memory system 210 may include a memory system controller 215 for executing the commands received from the host system 205 and controlling the data path components in the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, and a storage queue 270) may be used to control the processing of the access commands and the movement of the corresponding data. This may be beneficial, e.g., if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if used, may be positioned anywhere within the memory system 210.

Data transferred between the host system 205 and the memory devices 240 may take a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220, e.g., according to a protocol (e.g., a UFS protocol or an eMMC protocol). Thus, the interface 220 may be considered a front end of the memory system 210. Upon receipt of each access command, the interface 220 may communicate the command to the memory system controller 215, e.g., via the bus 235. In some cases, each command may be added to a command queue 260 by the interface 220 to communicate the command to the memory system controller 215.

The memory system controller 215 may determine that an access command has been received in response to the communication from the interface 220. In some cases, the memory system controller 215 may determine the access command has been received by retrieving the command from the command queue 260. The command may be removed from the command queue 260 after it has been retrieved therefrom, e.g., by the memory system controller 215. In some cases, the memory system controller 215 may cause the interface 220, e.g., via the bus 235, to remove the command from the command queue 260.

Upon the determination that an access command has been received, the memory system controller 215 may execute the access command. For a read command, this may mean obtaining data from the memory devices 240 and transmitting the data to the host system 205. For a write command, this may mean receiving data from the host system 205 and moving the data to the memory devices 240.

In either case, the memory system controller 215 may use a buffer 225 for, among other things, temporary storage of the data being received from or sent to the host system 205. The buffer 225-*a* or the buffer 225-*b* may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may first determine if a buffer 225 has sufficient available space to store the data associated with the command. For example, the memory system controller 215 may determine, e.g., via firmware (e.g., controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. That is, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), e.g., according to a protocol (e.g., a UFS protocol or an eMMC protocol). As the interface 220 subsequently receives from the host system 205 the data associated with the write command, the interface 220 may transfer the data to the buffer 225 for temporary storage using the data path 250. In some cases, the interface 220 may obtain from the buffer 225 or buffer queue 265 the location within the buffer 225 to store the data. The interface 220 may indicate to the memory system controller 215, e.g., via the bus 235, if the data transfer to the buffer 225 has been completed.

Once the write data has been stored in the buffer 225 by the interface 220, the data may be transferred out of the buffer 225 and stored in a memory device 240. This may be done using the storage controller 230. For example, the memory system controller 215 may cause the storage controller 230 to retrieve the data out of the buffer 225 using the data path 250 and transfer the data to a memory device 240. The storage controller 230 may be considered a back end of the memory system 210. The storage controller 230 may indicate to the memory system controller 215, e.g., via the bus 235, that the data transfer to a memory device of the memory devices 240 has been completed.

In some cases, a storage queue 270 may be used to aid with the transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain from the buffer 225, buffer queue 265, or storage queue 270 the location within the buffer 225 from which to obtain the data. The storage controller 230 may manage the locations within the memory devices 240 to store the data (e.g., performing wear-leveling, garbage collection, and the like). The entries may be added to the storage queue 270, e.g., by the memory system controller 215. The entries may be removed from the storage queue 270, e.g., by the storage controller 230 or memory system controller 215 upon completion of the transfer of the data.

To support access commands, such as write commands, the system 200 may implement two-stage buffer operations. For example, rather than using a single buffer 225 to store data for a command, such as a write command, the system 200 may implement two buffers: a flush buffer 275 and a temporary buffer 280. The flush buffer 275 and the temporary buffer 280 may be subsets of a same buffer 225 (e.g., may form a multi-stage buffer process using the same buffer 225) or may be separate buffers in memory. In some examples, the multi-stage buffer process may include two stages while in other examples the multi-stage buffer process may include more stages. In some examples, the buffer 225-a may include a flush buffer 275-a and a temporary buffer 280-a, or the buffer 225-b may include a flush buffer 275-b and a temporary buffer 280-b. The flush buffer 275 and the temporary buffer 280 may correspond to the two stages of the multi-stage buffer operations. As an example, host data may be written into an mNAND device (e.g., a memory system 210). The data may be sent to a write buffer (e.g., a buffer 225-a) of the mNAND controller (e.g., a memory system controller 215) and later flushed from the write buffer into NAND flash (e.g., memory devices 240). The write buffer may be divided into two buffers, a flush buffer 275-a and a temporary buffer 280-a, to support multi-stage buffer operations.

The system 200 may receive a command (e.g., a write command) to write data to a memory device 240. In some cases, the command may be received from the host system 205. The write command may be associated with a specific data transfer size for the data. Based on or in response to the data transfer size and a threshold size, the memory system controller 215, the buffer queue 265, or a combination thereof may determine whether to add the data to a flush buffer 275, a temporary buffer 280, or a combination thereof (e.g., adding a first portion of the data to the flush buffer 275 and adding a second, distinct portion of the data to the temporary buffer 280). For example, the threshold size may be a multi-plane page size of the memory device 240, as described with reference to FIG. 1. The memory system controller 215, the buffer queue 265, or the combination thereof may add data to the flush buffer 275 in chunks of the threshold size (e.g., the multi-plane page size of the memory device 240) and may add other data (e.g., data smaller than the threshold size) to the temporary buffer 280. If the data stored in the temporary buffer 280 satisfies a copy threshold (e.g., the data meets or exceeds the multi-plane page size), data of the threshold size may be copied from the temporary buffer 280 to the flush buffer 275 and removed from or overwritten in the temporary buffer 280. Accordingly, data added to the flush buffer 275 is added in chunks of the threshold size.

The flush buffer 275 may flush data (e.g., may transfer out from the flush buffer 275) into the memory device 240 (e.g., using a storage controller 230, a storage queue 270, or both). Flushing the data may involve writing the data to one or more partitions of a memory device 240 and removing the corresponding data from the flush buffer 275. If the threshold size for data chunks in the flush buffer 275 is equal to the multi-plane page size of the memory device 240, the multi-stage buffer operations ensure that data written from the flush buffer 275 to the memory device 240 may be written starting at an offset of zero and may fill one or more complete multi-plane pages (such that a subsequent write operation from the flush buffer 275 also starts at on offset of zero). As such, by implementing a first buffer (e.g., a flush buffer 275) and a second buffer (e.g., a temporary buffer 280) to handle operations, such as write operations, the memory system 210 may avoid die misalignment in one or more memory devices 240, among other advantages. In some examples, the multi-stage buffer process may include two stages while in other examples the multi-stage buffer process may include more stages.

To process a read command received from the host system 205, the memory system controller 215 may again first determine if the buffer 225 has sufficient available space to store the data associated with the command. For example, the memory system controller 215 may determine, e.g., via firmware (e.g., controller firmware), an amount of space within the buffer 225 that may be available to store data associated with the read command.

In some cases, the buffer queue 265 may be used to aid with buffer storage of data associated with read commands in a similar manner as discussed above with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215, e.g., via the bus 235, once the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain from the buffer 225 or storage queue 270 the location within the memory devices 240 from which to retrieve the data. In some cases, the storage controller 230 may obtain from the buffer queue 265 the location within the buffer 225 to store the data. In some cases, the storage controller 230 may obtain from the storage queue 270 the location within the buffer 225 to store the data. In some cases, the memory system controller 215 may move the command processed by the storage queue 270 back to the command queue 260.

Once the data has been stored in the buffer 225 by the storage controller 230, the data may be transferred out of the buffer 225 and sent to the host system 205. For example, the memory system controller 215 may cause the interface 220 to retrieve the data out of the buffer 225 using the data path 250 and transmit the data to the host system 205, e.g., according to a protocol (e.g., a UFS protocol or an eMMC protocol). For example, the interface 220 may process the command from the command queue 260 and may indicate to the memory system controller 215, e.g., via the bus 235, that the data transmission to the host system 205 has been completed.

The memory system controller 215 may execute received commands according to an order (e.g., a first-in, first-out order, according to the order of the command queue 260). For each command, the memory system controller 215 may cause data corresponding to the command to be moved into and out of the buffer 225, as discussed above. As the data is moved into and stored within the buffer 225, the command may remain in the buffer queue 265. A command may be removed from the buffer queue 265, e.g., by the memory system controller 215, if the processing of the command has been completed (e.g., if data corresponding to the access command has been transferred out of the buffer 225). If a command is removed from the buffer queue 265, the address previously storing the data associated with that command may be available to store data associated with a new command.

The memory system controller 215 may additionally be configured for operations associated with the memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. That is, the host system 205 may issue commands indicating one or more LBAs and the memory system controller 215 may identify one or more physical block addresses indicated by the LBAs. Based on or in response to the two-stage buffer operations, the start LBA for each write operation may be distributed at an offset of zero in the physical multi-plane pages to support die alignment. In some cases, one or more contiguous LBAs may correspond to noncontiguous physical block addresses. In some cases, the storage controller 230 may be configured to perform one or more of the above operations in conjunction with or instead of the memory system controller 215. In some cases, the memory system controller 215 may perform the functions of the storage controller 230 and the storage controller 230 may be omitted.

Figure 3:
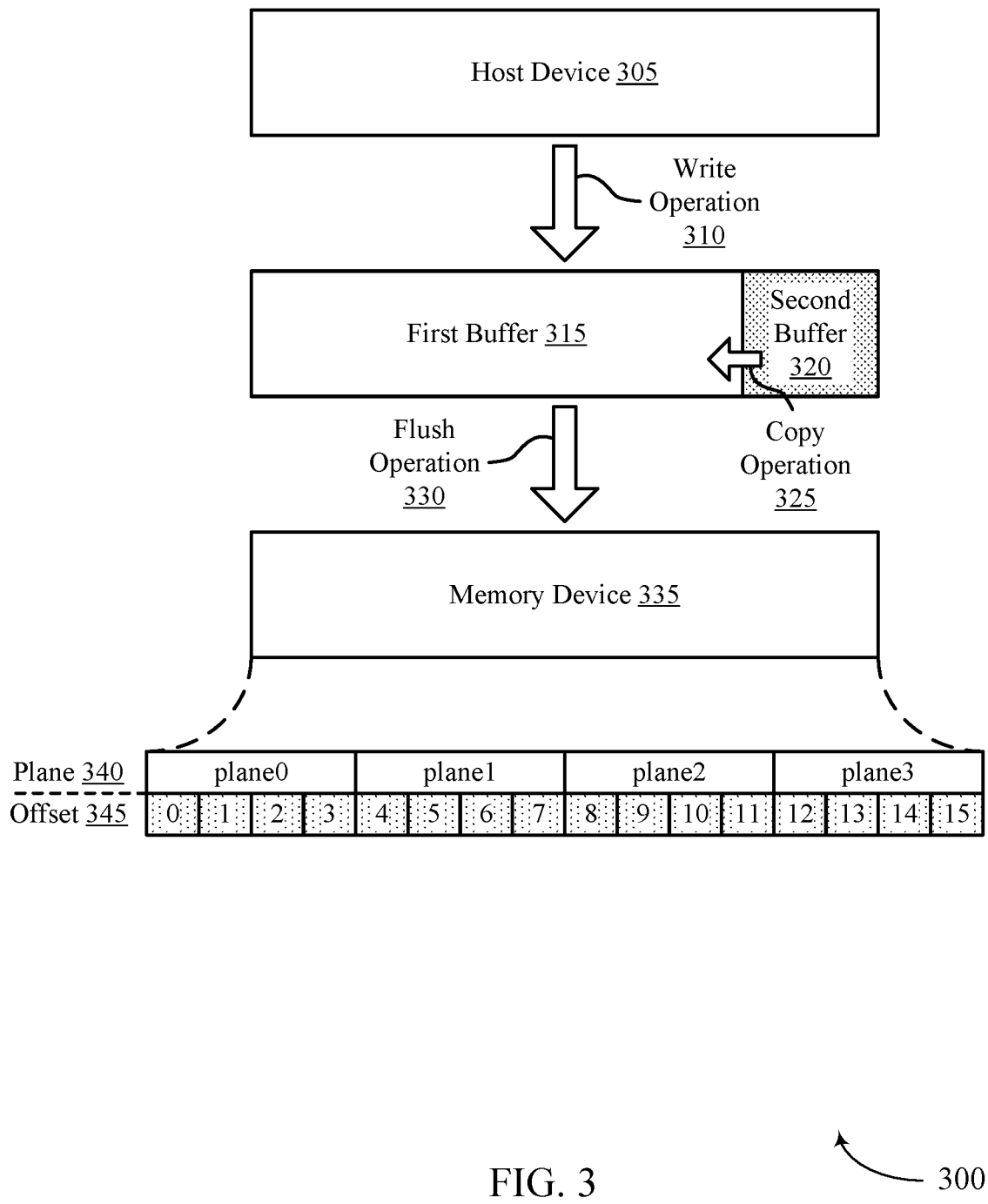
FIGS. 3 and 4 illustrate examples of data flows that support two-stage buffer operations supporting write commands in accordance with examples as disclosed herein.

FIG. 3 illustrates an example of a data flow 300 that supports two-stage buffer operations supporting write commands in accordance with examples as disclosed herein. The data flow 300 may be implemented by a system 100 (or one or more components thereof) or a system 200 (or one or more components thereof) as described with reference to FIGS. 1 and 2. For example, the host device 305 may be an example or component of a host system 105 or a host system 205, the first buffer 315 may be an example of a flush buffer 275, the second buffer 320 may be an example of a temporary buffer 280, and the memory device 335 may be an example of a memory device 130 or a memory device 240 as described with reference to FIGS. 1 and 2. The data flow 300 may use the first buffer 315 and the second buffer 320 to avoid die misalignment in the memory device 335, improving the read performance for data files stored in the memory device 335 (e.g., as compared to read operations for die-misaligned data).

A multi-plane page of the memory device 335 may include a set of planes 340 and multiple offsets 345. For example, as described with reference to FIG. 1, a multi-plane page may include four planes 340 (e.g., plane0, plane1, plane2, and plane3) and sixteen offsets 345 (e.g., 0 through 15). If a memory system receives a read command on the memory device 335, the read command may indicate a start LBA for reading data from the memory device 335. The start LBA may correspond to an offset 345 in a multi-plane page (e.g., based on a logical-to-physical (L2P) mapping).

If the start LBA maps to the offset 0 (e.g., corresponding to die alignment), the memory system may efficiently read the data from the memory device 335. For example, due to the die alignment, the memory system may perform a single read operation (e.g., a system level sequential read operation) to read the data from the memory device 335 and may leverage a cache read operation to further improve the read performance. Based on or in response to reading data starting from the offset 0, the memory device 335 may support a relatively large chunk size (e.g., 512 kB) sequential and random read performance of approximately 2000 megabytes per second (MBps). Alternatively, if the start LBA maps to an offset other than zero (e.g., any offset from 1 through 15), the read performance at the device level (e.g., memory device 335 level) and the system level (e.g., memory system level) may decrease as compared to reading data starting from the offset of zero. For example, due to the die misalignment, the memory system may perform two read operations to read the data from the memory device 335 starting from the correct offset and may not support leveraging a cache read operation (e.g., based on or in response to performing two read operations to read the data from the multi-plane page). Due to performing two read commands without leveraging a cache read operation, reading data with die misalignment may significantly increase processing overhead and processing latency as compared to reading data with die alignment. The memory device 335 may support a read performance of approximately 1000 MBps for die misalignment. This decrease in performance associated with die misalignment may be especially significant if reading a relatively large data file (e.g., above a threshold file size) due to reading the relatively large data file from multiple multi-plane pages.

A host device 305 may support an optimal transfer length for relatively large-sized file operations according to characteristics of the host device 305, the memory system, or a combination thereof. In some examples, the host device 305 may support a write optimal transfer length, L, for relatively large-sized file operations of 512 kB or 1024 kB. The host device 305 may package user data for write operations using the optimal transfer length. Additionally, the host device 305 may support metadata and small file operations of variable transfer lengths. For example, the host device 305 may write small files or metadata to a memory device 335, where a small file or metadata may have a transfer length that is dynamically determined according to the small file size or the metadata size. The transfer length for small files or metadata may be smaller than the optimal transfer length for relatively large-sized files. In some cases, the host device 305 may support a minimum threshold size for reading and writing metadata and small files to the memory device 335 (e.g., 4 kB).

In some cases, die misalignment may occur in response to a memory system mixing relatively large files with small files or metadata in the same multi-plane page. For example, the host device 305 may start writing user data for a relatively large file to a memory device 335, update metadata of the relatively large file or insert a small file into the memory device 335, and continue writing the relatively large file. Such a process may occur due to multiple threads running in parallel at the host device 305, where one thread writes the relatively large file to the memory device 335 and another thread concurrently updates metadata or writes a small file to the memory device 335. Mixing the user data for the relatively large file with metadata, small file data, or both in the write buffer may result in a die-misalignment configuration in the memory device 335 (e.g., in NAND flash). For example, the write buffer may flush metadata or small file data into a subset of units in the multi-plane page (e.g., starting at offset 0, the metadata or small file data may be stored in the first two units of the multi-plane page). In response to this metadata update or small file creation, the write buffer may flush the user data of the relatively large file into the remaining units of the multi-plane page. Due to the metadata or small file data, the user data for the relatively large file may start at an offset 345 other than zero (e.g., starting at offset 2 and spanning the remaining units of the multi-plane page). Accordingly, using a single write buffer may result in die misalignment for relatively large files if metadata updates, small file creation, or both are performed, where mixing the relatively large files with small files or metadata in the same multi-plane page negatively affects the read performance on the relatively large file data.

Some systems may implement dummy data padding to avoid relatively large file user data die misalignment. For example, a system may check a host write operation to determine data chunk sizes for the write operation. If the system detects a write operation for a small data chunk size (e.g., less than the size of a multi-plane page) inserted within a write operation for a relatively large data chunk size (e.g., of the optimal transfer length or another similar length), the system may pad the small data chunk size with dummy data in the write buffer such that the small data chunk with the additional dummy data is equal to the multi-plane page size. Accordingly, writing the small data chunk with the additional dummy data to the memory device 335 may not result in die misalignment, as the small data chunk with the additional dummy data fills a multi-plane page. However, storing dummy data reduces the life of the memory device 335 by using a portion of the total bytes written (TBW) for the memory device 335. Additionally, if data is relocated within the memory device 335 (e.g., for garbage collection, folding), the dummy data—which may be an example of invalid data—may be removed in the relocation process. Accordingly, the effect of dummy data padding to avoid die misalignment may be lost upon data relocation.

Some other systems may implement different open blocks to avoid relatively large file user data die misalignment. For example, a system may implement a chunk size threshold for writing data, where the chunk size threshold is equal to the multi-plane page size (e.g., 64 kB). If the data chunk size for a write operation is below the chunk size threshold, the system may write the data into the first open block (e.g., a temporary SLC open block). Otherwise, if the data chunk size for the write operation is equal to or above the chunk size threshold, the system may write the data into the second open block (e.g., a major TLC open block). Such a process may avoid mixing storage of relatively large file data with storage of small file data or metadata. However, the chunk size may not consistently be an accurate indicator of data type. In some cases, a metadata write chunk size may be greater than the chunk size threshold or a relatively large file write chunk size may be less than the chunk size threshold. For example, to write a relatively large file of size 32788 kB, a host device 305 may send multiple write commands of the optimal transfer length, resulting in a final write command of kB (e.g., below the multi-plane page size). This final write command may create a die misalignment for subsequent files stored in the same block. Additionally, maintaining multiple open blocks for a host device 305 may increase resource overhead at the memory system. For example, the memory system may perform redundant array of independent disks (RAID) protection and data flush switches between different open blocks, increasing the processing overhead associated with write operations for the system implementing different open blocks.

In contrast, a memory system implementing the data flow 300 may support two-stage buffer operations (e.g., using the first buffer 315 and the second buffer 320) to avoid die misalignment. The two-stage buffer operations may support a more efficient use of memory resources of the memory device 335 than a system implementing dummy data padding, for example, by not using resources to store dummy data. Additionally, the two-stage buffer operations may avoid die misalignment even if data is relocated. Further, the two-stage buffer operations may support a more efficient use of processing resources than a system implementing different open blocks to avoid die misalignment, for example, by managing fewer open blocks for handling host write data than the system implementing different open blocks.

The data flow 300 may use multiple buffers instead of a single write buffer. For example, the write buffer for the memory system may be separated into, or may include, two buffers, a flush buffer (e.g., a first buffer 315) and a temporary buffer (e.g., a second buffer 320) to avoid mixing small file data and metadata with relatively large file data. If a host device 305 performs a write operation 310, the data for the write operation 310 may be added to the first buffer 315, the second buffer 320, or a combination thereof based on or in response to the data transfer size and a threshold size (e.g., equal to the multi-plane page size). Accordingly, data may be added to the first buffer 315 in chunks of a size equal to the multi-plane page size, while data may be added to the second buffer 320 in chunks of sizes less than the multi-plane page size. If the data stored in the second buffer 320 reaches the threshold size, the memory system may perform a copy operation 325 to copy data of the threshold size (e.g., including multiple chunks of data corresponding to metadata, small data files, or both that together equal the multi-plane page size) from the second buffer 320 to the first buffer 315. If a flush condition is met by the first buffer 315, the first buffer 315 may perform a flush operation 330 to write data from the first buffer 315—but not from the second buffer 320—to multi-plane pages of the memory device 335. By using the first buffer 315 and the second buffer 320 to ensure data is added to the first buffer 315 in chunks of a size equal to the multi-plane page size, the memory system may avoid mixing relatively large file data with metadata or small file data in the same multi-plane page of the same block. Accordingly, the two-stage buffer operations for write commands may reduce die misalignment in the memory device 335 and, correspondingly, improve read performance for the memory system.

Figure 4:
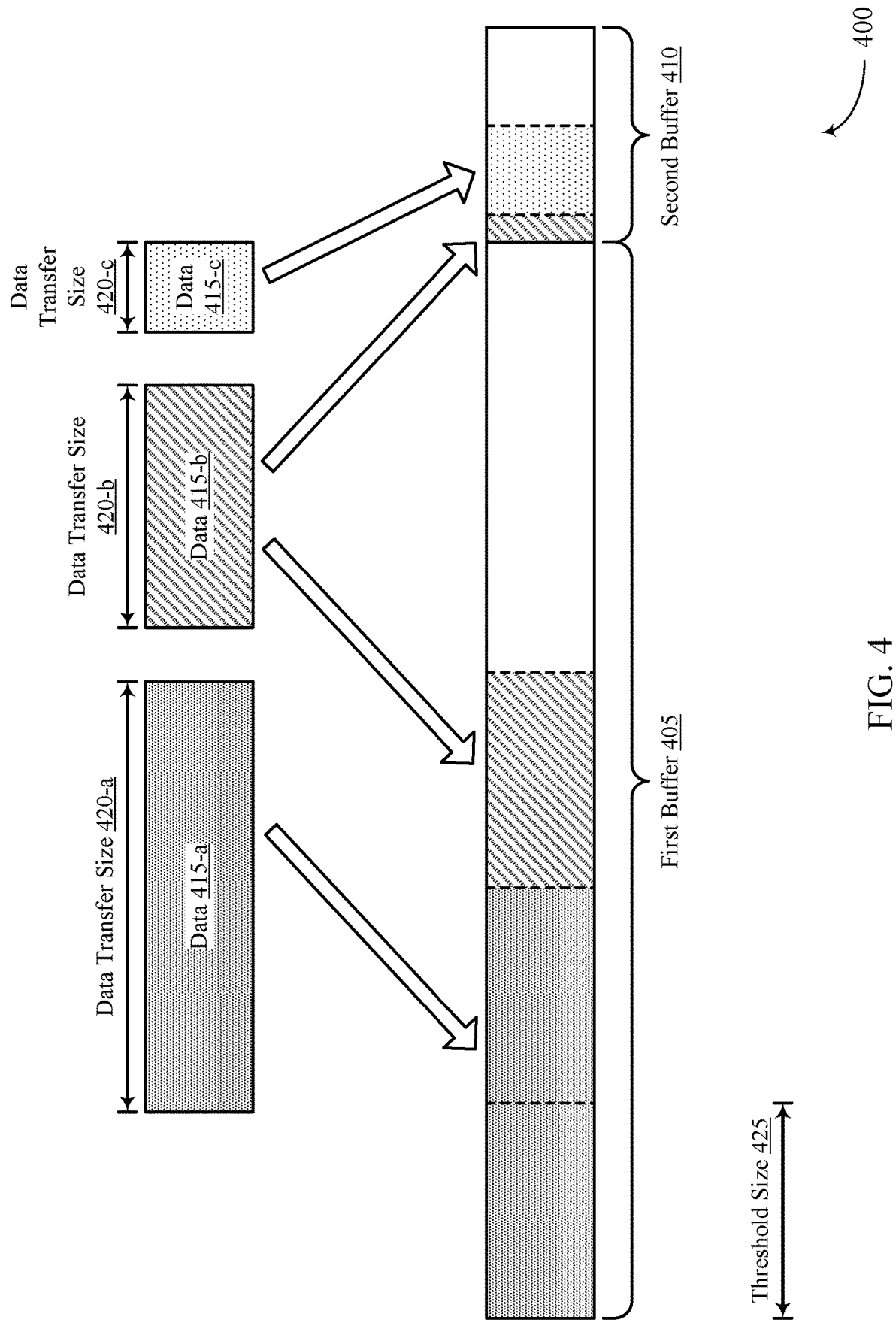

FIG. 4 illustrates an example of a data flow 400 that supports two-stage buffer operations supporting write commands in accordance with examples as disclosed herein. The data flow 400 may be implemented by a system 100 (or one or more components thereof) or a system 200 (or one or more components thereof) as described with reference to FIGS. 1 and 2. For example, the data flow 400 may be an example of a write operation 310 as described with reference to FIG. 3. The first buffer 405 may be an example of a flush buffer 275, a first buffer 315, or both, and the second buffer 410 may be an example of a temporary buffer 280, a second buffer 320, or both as described with reference to FIGS. 2 and 3. The first buffer 405 and the second buffer 410 may be components of a write buffer or may be separate buffers. A memory system may implement the first buffer 405 and the second buffer 410 to mitigate die misalignment for write operations.

In some examples, an apparatus (e.g., a memory system) may include the first buffer 405 and the second buffer 410. The first buffer 405 may be configured to support storing data of a first data size (e.g., a threshold size 425), while the second buffer 410 may be configured to support storing data of sizes less than the first data size (e.g., the threshold size 425). Further, the second buffer 410 may be configured to trigger a copy operation upon satisfying a copy condition. The copy condition may be the second buffer 410 storing a total amount of data equal to or greater than the threshold size 425. The second buffer 410, upon triggering the copy operation, may be configured to copy data of the threshold size 425 from the second buffer 410 into the first buffer 405. The second buffer 410 may delete the copied data from the second buffer 410 or may maintain and overwrite the data during subsequent write operations. The first buffer 405 may be configured to trigger a buffer flush operation upon satisfying a flush condition. The flush condition may, in some examples, be the first buffer 405 storing a total amount of data equal to or greater than a flush threshold (e.g., the size of the first buffer 405). The first buffer 405, upon triggering the buffer flush operation, may be configured to write data to one or more memory devices. The second buffer 410 may refrain from writing data to a memory device in direct response to the triggered buffer flush operation, and may instead maintain data in the second buffer 410 (e.g., maintaining a portion of data in the write buffer despite the buffer flush operation). The first buffer 405 may be configured to write chunks of data of the threshold size 425 to each multi-plane page of the memory device(s) to avoid die misalignment, where the multi-plane page size may be equal to the threshold size 425.

As an example, the memory system may support writing data to one or more memory devices with multi-plane page sizes of 64 kB. In some cases, the write buffer may support a storage capacity of 832 kB. According to the multi-plane page size, the write buffer may be divided into a first buffer 405 (e.g., a flush buffer) of size 768 kB and a second buffer 410 (e.g., a temporary buffer) of size 64 kB. Data, such as relatively large file data, may be added to the first buffer 405 in data chunks of 64 kB each (e.g., the threshold size 425 may be 64 kB), while data, such as small file data, metadata, or remainder relatively large file data, may be added to the second buffer 410 in data chunks smaller than 64 kB. If the second buffer 410 is full, the second buffer 410 may copy 64 kB of data into the first buffer 405. In some examples, the second buffer 410 may include additional storage capacity beyond the threshold size 425.

Additionally or alternatively, the memory system may include multiple temporary buffers, such that if a first temporary buffer is full, the memory system may add data to another temporary buffer until the data from the first temporary buffer is successfully copied into the flush buffer. If the first buffer 405 is full or otherwise satisfies a flush condition, the first buffer 405 may, in some examples, trigger a buffer auto-flush mechanism to write data from the first buffer 405—but not the second buffer 410—to one or more memory devices (e.g., NAND flash, SSDs, or other memory devices).

If the memory system receives a command to write data to a memory device, the memory system may determine whether to add the data to the first buffer 405, the second buffer 410, or a combination thereof based on or in response to the data transfer size 420 of the data and a threshold size 425. For example, if the data transfer size 420 is greater than or equal to the threshold size 425, the memory system may identify one or more portions of the data having the threshold size 425 and may determine to add the one or more portions of the data to the first buffer 405. For example, for the data 415-a with data transfer size 420-a, the memory system may determine to add two portions of the threshold size 425 to the first buffer 405. Because the data transfer size 420-a is a multiple of the threshold size 425, the memory system may determine to add the data 415-a to the first buffer 405 and not the second buffer 410.

In some examples, the data 415 may consist of the one or more portions of the threshold size 425 and an additional portion less than the threshold size 425 (e.g., remainder relatively large file data) if the data transfer size 420 is not a multiple of the threshold size 425. In some such examples, the memory system may determine to add the one or more portions of the data having the threshold size 425 to the first buffer 405 and add the additional portion with a size less than the threshold size 425 to the second buffer 410. For example, for the data 415-b with data transfer size 420-b, the memory system may determine to add one portion of the threshold size 425 to the first buffer 405 and an additional portion less than the threshold size 425 to the second buffer 410. Because the data transfer size 420-b is greater than the threshold size 425, but is not a multiple of the threshold size 425, the memory system may determine to add the data 415-b to a combination of the first buffer 405 and the second buffer 410 (e.g., addition different, discrete portions of the data 415-b to the first buffer 405 and the second buffer 410).

If the data transfer size 420 is less than the threshold size 425, the memory system may add the data 415 to the second buffer 410. For example, for the data 415-c with data transfer size 420-c, the memory system may determine to add the data 415-c to the second buffer 410 and not the first buffer 405 due to the data transfer size 420-c being less than the threshold size 425. Using such techniques, the memory system may load any data received for a write command into the first buffer 405, the second buffer 410, or a combination thereof, where the buffers determine how to write the data to one or more memory devices.

Figure 5:
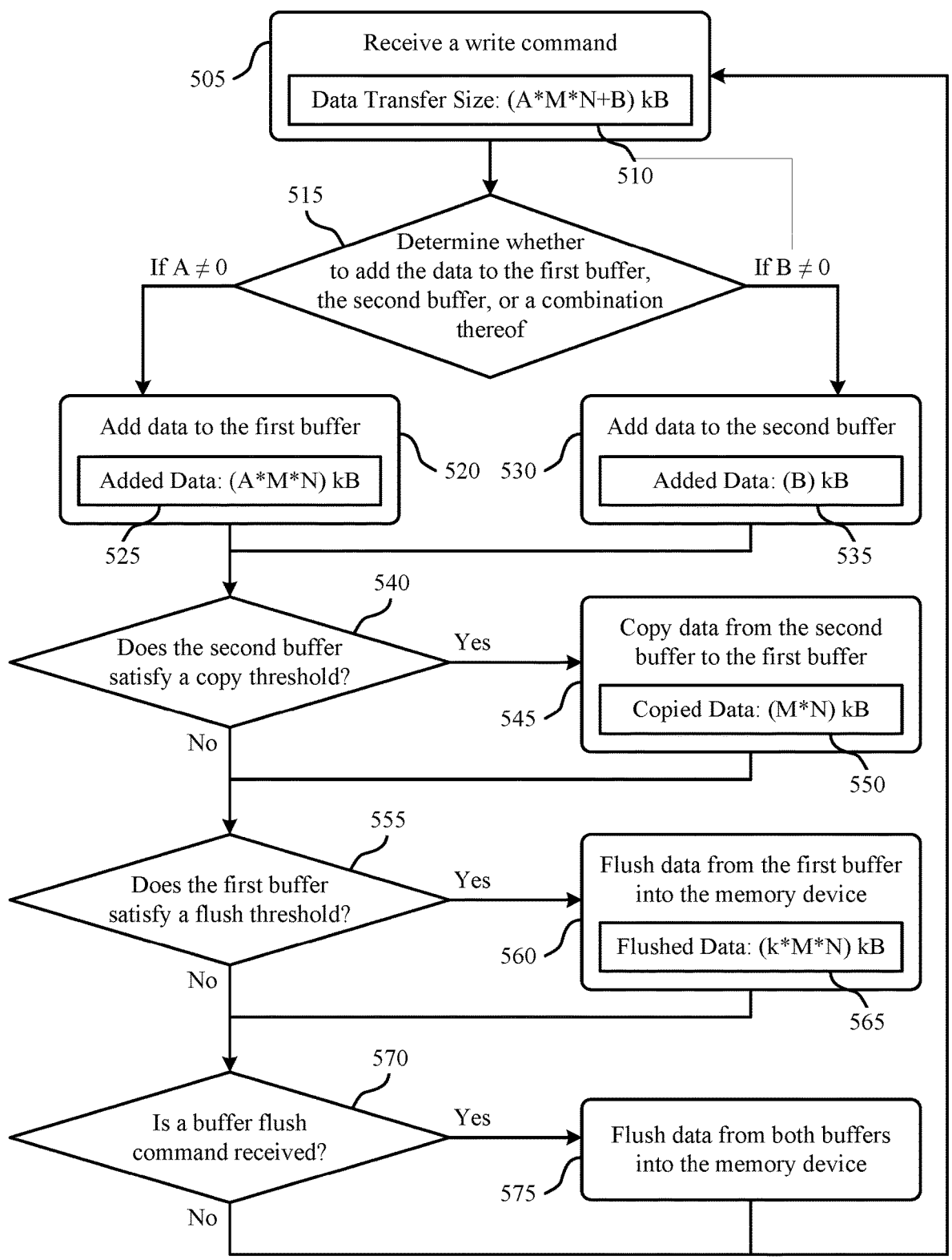
FIG. 5 illustrates an example of a process flow that supports two-stage buffer operations supporting write commands in accordance with examples as disclosed herein.

FIG. 5 illustrates an example of a process flow 500 that supports two-stage buffer operations supporting write commands in accordance with examples as disclosed herein. The process flow 500 may be implemented by a system 100 (or one or more components thereof) or a system 200 (or one or more components thereof) as described with reference to FIGS. 1 and 2 and may implement a data flow 300 or a data flow 400 as described with reference to FIGS. 3 and 4. For example, the process flow 500 may be implemented by an apparatus (e.g., a memory system) including one or more memory devices and a controller coupled with the memory device(s). A memory device of the memory system may include a physical page size, M, and a quantity of planes, N, such that each multi-plane page size is equal to M*N. The memory system may implement the process flow 500 to write data to the multi-plane pages at offsets of zero to avoid die misalignment and support improved read performance. In some cases, alternative examples of the following may be implemented, where some operations may be performed in a different order than described or are not performed at all. Additionally or alternatively, operations may include additional features not mentioned below, or further processes may be added.

At 505, a write command is received. For example, a memory system may receive the write command (e.g., a host write operation) from a host system. The write command may be received at the controller of the memory system. The write command may indicate data to write to memory (e.g., to one or more memory devices, such as NAND flash, SSDs, or other memory devices). The data transfer size 510 of the data to write to memory may be expressed as (A*M*N+B) kB. For example, the data may include a quantity of portions, A, of data equal to the multi-plane page size of M*N, plus an additional portion of data, B, less than the multi-plane page size. For relatively large data files, the portion B may be referred to as the remainder relatively large file data (e.g., remaining after dividing the relatively large data file into A portions of size M*N).

At 515, the memory system determines whether to add the data to a first buffer, a second buffer, or a combination thereof. The first buffer may be an example of a flush buffer and the second buffer may be an example of a temporary buffer. If A≠0, at least a portion of the data is added to the first buffer at 520. Specifically, the memory system may determine to add A*M*N data 525 (e.g., A portions of the data of size M*N) to the first buffer. If B≠0, at least a portion of the data is added to the second buffer at 530. Specifically, the memory system may determine to add B data 535 (e.g., a portion of the data of size B) to the second buffer.

For example, if the data transfer size 510 is less than the multi-plane page size (e.g., less than M*N, such that A=0), the data may be added to the temporary buffer at 530. For example, if the data transfer size 510 is an "optimal" transfer length (e.g., the data transfer size 510 is a multiple of the multi-plane page size M*N, such that B=0), the data may be added directly to the flush buffer at 520. If the data transfer size 510 is greater than the multi-plane page size but is not a multiple of the multi-plane page size, such that A≠0 and B≠0, the data may be added to a combination of the flush buffer and the temporary buffer at 520 and 530. For example, A*M*N data 525 may be added to the flush buffer at 520 and B data 535 may be added to the temporary buffer at 530.

At 540, the memory system determines whether the second buffer (e.g., the temporary buffer) satisfies a copy threshold. The second buffer may satisfy the copy threshold (e.g., a copy condition) if the second buffer stores an amount of data equal to or greater than a threshold size (e.g., the multi-plane page size M*N). If the copy threshold is satisfied, at 545, the memory system may copy at least a portion of the data stored in the second buffer into the first buffer.

For example, the memory system may copy data 550 of the threshold size (e.g., the multi-plane page size M*N) from the temporary buffer into the flush buffer. If the temporary buffer size is M*N, the copy condition for the temporary buffer may be the temporary buffer being full. If the temporary buffer is full, the memory system may move (e.g., copy or relocate) the data from the temporary buffer to the flush buffer. In some examples, the temporary buffer may invalidate the copied data stored in the temporary buffer in response to copying the data into the flush buffer, such that the invalidated data may be overwritten in the temporary buffer. If the copy threshold is not satisfied, the memory system may continue storing the data in the temporary buffer.

At 555, the memory system determines whether the first buffer (e.g., the flush buffer) satisfies a flush threshold. The first buffer may satisfy the flush threshold (e.g., a flush condition) if the first buffer stores an amount of data equal to or greater than a flush threshold size (e.g., based on the size of the first buffer). If the flush threshold is satisfied, at 560, the memory system may flush the data from the first buffer into a memory device (e.g., NAND flash or another memory device).

For example, the memory system may write data 565 of size k*M*N to one or more memory devices supporting multi-plane pages of size M*N. That is, because data is added to the first buffer in chunks of size M*N, the data to flush from the first buffer is a multiple, k, of M*N. Accordingly, writing the k*M*N to multi-plane pages of a memory device starts at an offset of zero and ends at a completed multi-plane page, such that the next write operation will also start at an offset of zero and avoid die misalignment. The second buffer may refrain from flushing data into a memory device in direct response to the first buffer satisfying the flush threshold (e.g., to avoid die misalignment). If the flush threshold is not satisfied, the memory system may continue storing the data in the flush buffer.

At 570, the memory system determines whether a buffer flush command is received. A buffer flush command may be an example of a synch cache operation or any other compel buffer flush operation. The buffer flush command may be received from a host system or may be triggered in the memory system. If a buffer flush command is received, the data may be flushed from both buffers (e.g., the first buffer and the second buffer) into the memory device(s) at 575. For example, the memory system may flush the data from the flush buffer into a memory device as if a flush threshold is satisfied. For the temporary buffer, the memory system may flush the data from the temporary buffer into a temporary block in a memory device. By flushing the data from the temporary buffer into a temporary block different from the block in which data is written from the flush buffer, the memory system may avoid die misalignment. In some examples, the memory system may determine the amount of data written to the temporary block and may write additional data to the temporary block such that the data fills one or more complete multi-plane pages. If the data size written to the temporary block is a multiple of the multi-plane page size M*N, the memory system or memory device may relocate the data from the temporary block to another block without causing die misalignment.

The memory system may repeat such a process for each write operation to avoid die misalignment and improve read performance, for example, for relatively large data files (e.g., data files spanning multiple multi-plane pages).

Aspects of the process flow 500 may be implemented by a controller in a system (such as a system 100 or a system 200), among other components. Additionally or alternatively, aspects of the process flow 500 may be implemented as instructions stored in memory (e.g., firmware stored in a memory coupled with a memory system). For example, the instructions, when executed by a controller (e.g., a memory system controller), may cause the controller to perform the operations of the process flow 500.

Figure 6:
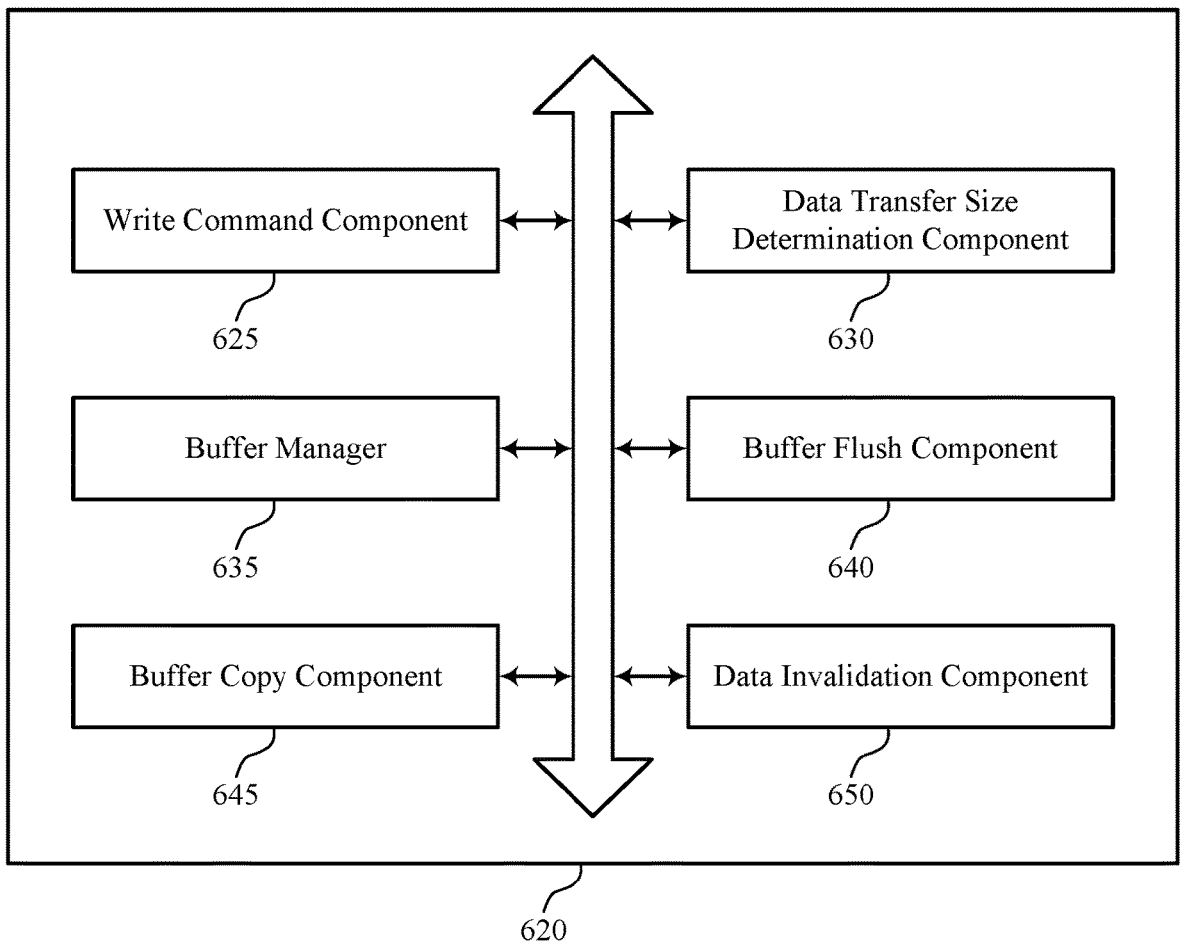
FIG. 6 shows a block diagram of a memory system that supports two-stage buffer operations supporting write commands in accordance with examples as disclosed herein.

FIG. 6 shows a block diagram 600 of a memory system 620 that supports two-stage buffer operations supporting write commands in accordance with examples as disclosed herein. The memory system 620 may be an example of aspects of a memory system as described with reference to FIGS. 1 through 5. The memory system 620, or various components thereof, may be an example of means for performing various aspects of two-stage buffer operations supporting write commands as described herein. For example, the memory system 620 may include a write command component 625, a data transfer size determination component 630, a buffer manager 635, a buffer flush component 640, a buffer copy component 645, a data invalidation component 650, or any combination thereof. Each of these components may communicate, directly or indirectly, with one another (e.g., via one or more buses, data paths, or both). The memory system 620 may be an example of an apparatus including a memory device and a controller coupled with the memory device and configured to cause the apparatus to perform one or more functions as described herein.

The write command component 625 may be configured as or otherwise support a means for receiving a command to write data to the memory device, the data having a data transfer size. The data transfer size determination component 630 may be configured as or otherwise support a means for determining whether to add the data to a first buffer, a second buffer, or a combination thereof based at least in part on the data transfer size and a threshold size. The buffer manager 635 may be configured as or otherwise support a means for adding the data to the first buffer, the second buffer, or the combination thereof (e.g., adding a first portion of the data to the first buffer and adding a second portion of the data distinct from the first portion of the data to the second buffer, the data containing the first portion and the second portion) based at least in part on the determining, the first buffer storing a first set of data and the second buffer storing a second set of data based at least in part on the adding. The buffer flush component 640 may be configured as or otherwise support a means for flushing the first set of data into the memory device based at least in part on the first set of data satisfying a flush condition for the first buffer, where the second set of data is maintained in the second buffer after flushing the first set of data into the memory device based at least in part on the flush condition for the first buffer. For example, flushing the first set of data from the first buffer into the memory device does not cause the second set of data to be flushed from the second buffer into the memory device. Instead, the memory system may refrain from flushing the second set of data into the memory device. In some examples, the first buffer may be referred to as a flush buffer, and the second buffer may be referred to as a temporary buffer.

In some examples, the data transfer size determination component 630 may be configured as or otherwise support a means for determining to add the data to the second buffer based at least in part on the data transfer size being less than the threshold size. In some such examples, the buffer manager 635 may be configured as or otherwise support a means for adding the data to the second buffer based at least in part on the determining to add the data to the second buffer.

In some examples, the data transfer size determination component 630 may be configured as or otherwise support a means for identifying one or more portions of the data based at least in part on the data transfer size being greater than or equal to the threshold size, each portion of the one or more portions having the threshold size and the data transfer size determination component 630 may be configured as or otherwise support a means for determining to add the one or more portions of the data to the first buffer based at least in part on each portion of the one or more portions having the threshold size. In some such examples, the buffer manager 635 may be configured as or otherwise support a means for adding the one or more portions of the data to the first buffer based at least in part on the determining to add the one or more portions of the data to the first buffer.

In some examples, the data consists of the one or more portions and an additional portion, the additional portion having an additional portion size less than the threshold size. In some such examples, the data transfer size determination component 630 may be configured as or otherwise support a means for determining to add the additional portion of the data to the second buffer based at least in part on the additional portion size being less than the threshold size. In some such examples, the buffer manager 635 may be configured as or otherwise support a means for adding the additional portion of the data to the second buffer based at least in part on the determining to add the additional portion of the data to the second buffer.

In some examples, the buffer copy component 645 may be configured as or otherwise support a means for copying at least a portion of the second set of data stored in the second buffer to the first buffer based at least in part on the second set of data satisfying a copy condition for the second buffer. In some examples, the second set of data satisfies the copy condition for the second buffer based at least in part on the second set of data having a second data size that is greater than or equal to the threshold size. In some examples, the portion of the second set of data has a third data size that is equal to the threshold size. In some examples, the data invalidation component 650 may be configured as or otherwise support a means for invalidating the portion of the second set of data stored in the second buffer based at least in part on copying at least the portion of the second set of data to the first buffer.

In some examples, to support flushing the first set of data into the memory device, the buffer flush component 640 may be configured as or otherwise support a means for writing the first set of data into the memory device at a multi-plane page offset of zero.

In some examples, the buffer flush component 640 may be configured as or otherwise support a means for receiving a buffer flush command. In some examples, the buffer flush component 640 may be configured as or otherwise support a means for flushing the second set of data into a temporary block of the memory device based at least in part on the buffer flush command.

In some examples, the threshold size is a product of a physical page size of the memory device and a quantity of planes of the memory device.

In some examples, the buffer manager 635 may be configured as or otherwise support a means for storing the data in a single buffer including the first buffer and the second buffer. In some other examples, the buffer manager 635 may be configured as or otherwise support a means for storing a first portion of the data in the first buffer. In some examples, the buffer manager 635 may be configured as or otherwise support a means for storing a second portion of the data in the second buffer separate from the first buffer. In some examples, the controller includes the first buffer and the second buffer. In some examples, the memory device includes a NAND memory device.

Figure 7:
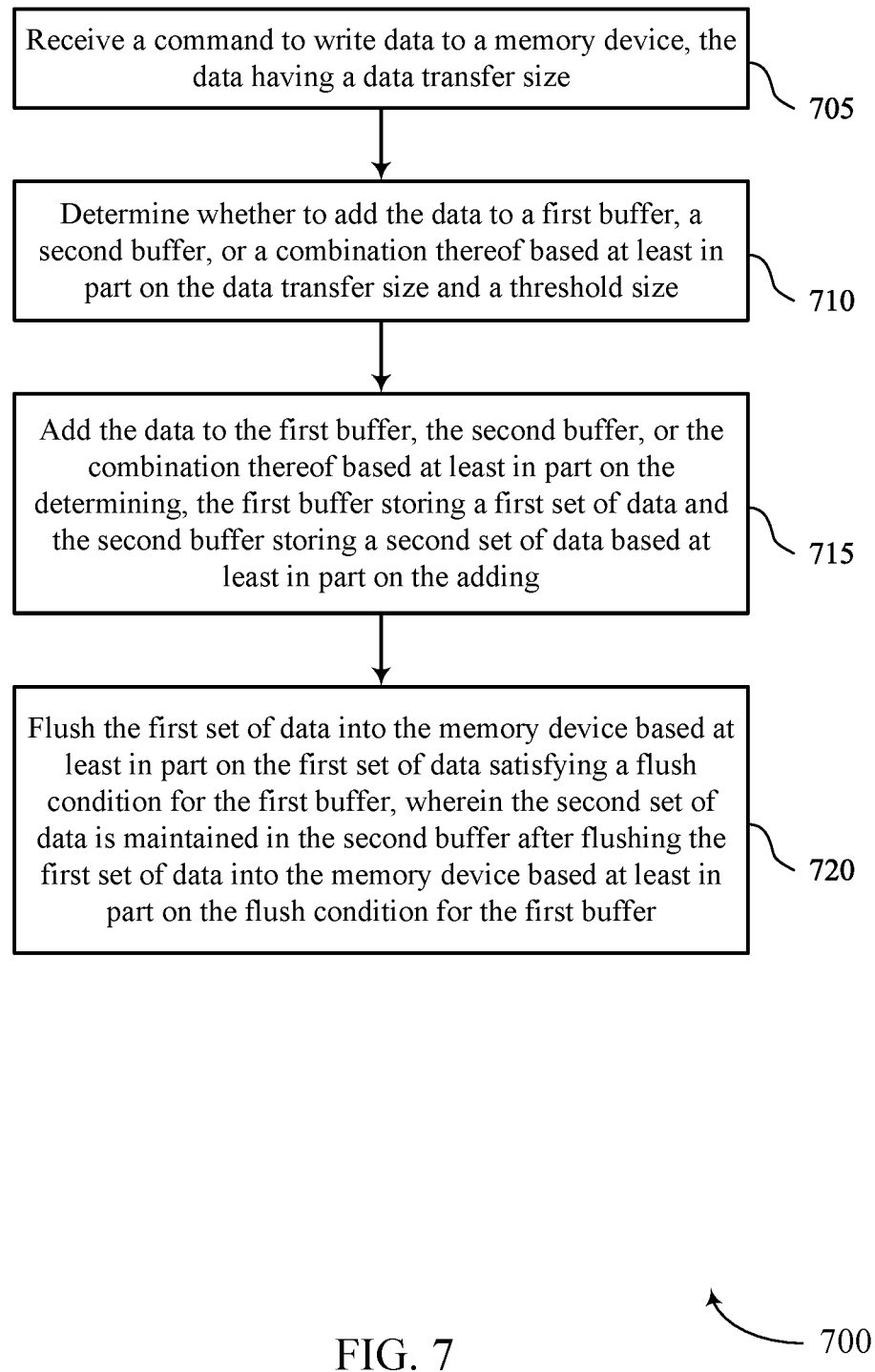
FIG. 7 shows a flowchart illustrating a method or methods that support two-stage buffer operations supporting write commands in accordance with examples as disclosed herein.

FIG. 7 shows a flowchart illustrating a method 700 that supports two-stage buffer operations supporting write commands in accordance with examples as disclosed herein. The operations of method 700 may be implemented by a memory system or its components as described herein. For example, the operations of method 700 may be performed by a memory system as described with reference to FIGS. 1 through 6. In some examples, a memory system may execute a set of instructions to control the functional elements of a device to perform the described functions. Additionally or alternatively, the memory system may perform aspects of the described functions using special-purpose hardware. In some examples, the memory system may be an example of an apparatus including a memory device and a controller coupled with the memory device and configured to cause the apparatus to perform one or more functions as described herein.

At 705, the method may include receiving a command to write data to a memory device, the data having a data transfer size. The operations of 705 may be performed in accordance with examples as disclosed herein. In some examples, aspects of the operations of 705 may be performed by a write command component 625 as described with reference to FIG. 6.

At 710, the method may include determining whether to add the data to a first buffer, a second buffer, or a combination thereof based at least in part on the data transfer size and a threshold size. The operations of 710 may be performed in accordance with examples as disclosed herein. In some examples, aspects of the operations of 710 may be performed by a data transfer size determination component 630 as described with reference to FIG. 6.

At 715, the method may include adding the data to the first buffer, the second buffer, or the combination thereof based at least in part on the determining, the first buffer storing a first set of data and the second buffer storing a second set of data based at least in part on the adding. The operations of 715 may be performed in accordance with examples as disclosed herein. In some examples, aspects of the operations of 715 may be performed by a buffer manager 635 as described with reference to FIG. 6.

At 720, the method may include flushing the first set of data into the memory device based at least in part on the first set of data satisfying a flush condition for the first buffer. The method may further include maintaining the second set of data in the second buffer after flushing the first set of data into the memory device based at least in part on the flush condition for the first buffer. The operations of 720 may be performed in accordance with examples as disclosed herein. In some examples, aspects of the operations of 720 may be performed by a buffer flush component 640 as described with reference to FIG. 6.

In some examples, an apparatus as described herein may perform a method or methods, such as the method 700. The apparatus may include features, circuitry, logic, means, or instructions (e.g., a non-transitory computer-readable medium storing code including instructions executable by a processor of an electronic device) for receiving a command to write data to a memory device, the data having a data transfer size, determining whether to add the data to a first buffer, a second buffer, or a combination thereof based at least in part on the data transfer size and a threshold size, adding the data to the first buffer, the second buffer, or the combination thereof based at least in part on the determining, the first buffer storing a first set of data and the second buffer storing a second set of data based at least in part on the adding, and flushing the first set of data into the memory device based at least in part on the first set of data satisfying a flush condition for the first buffer, where the second set of data is maintained in the second buffer after flushing the first set of data into the memory device based at least in part on the flush condition for the first buffer.

In some examples of the method 700 and the apparatus described herein, the determining whether to add the data to the first buffer, the second buffer, or the combination thereof may include operations, features, circuitry, logic, means, or instructions for determining to add the data to the second buffer based at least in part on the data transfer size being less than the threshold size, and the adding the data to the first buffer, the second buffer, or the combination thereof may include operations, features, circuitry, logic, means, or instructions for adding the data to the second buffer based at least in part on the determining to add the data to the second buffer.

In some examples of the method 700 and the apparatus described herein, the determining whether to add the data to the first buffer, the second buffer, or the combination thereof may include operations, features, circuitry, logic, means, or instructions for identifying one or more portions of the data based at least in part on the data transfer size being greater than or equal to the threshold size, each portion of the one or more portions having the threshold size and determining to add the one or more portions of the data to the first buffer based at least in part on each portion of the one or more portions having the threshold size, and the adding the data to the first buffer, the second buffer, or the combination thereof may include operations, features, circuitry, logic, means, or instructions for adding the one or more portions of the data to the first buffer based at least in part on the determining to add the one or more portions of the data to the first buffer.

In some examples of the method 700 and the apparatus described herein, the data consists of the one or more portions and an additional portion, the additional portion having an additional portion size less than the threshold size, the determining whether to add the data to the first buffer, the second buffer, or the combination thereof may include operations, features, circuitry, logic, means, or instructions for determining to add the additional portion of the data to the second buffer based at least in part on the additional portion size being less than the threshold size, and the adding the data to the first buffer, the second buffer, or the combination thereof may include operations, features, circuitry, logic, means, or instructions for adding the additional portion of the data to the second buffer based at least in part on the determining to add the additional portion of the data to the second buffer.

Some examples of the method 700 and the apparatus described herein may further include operations, features, circuitry, logic, means, or instructions for copying at least a portion of the second set of data stored in the second buffer to the first buffer based at least in part on the second set of data satisfying a copy condition for the second buffer.

In some examples of the method 700 and the apparatus described herein, the second set of data satisfies the copy condition for the second buffer based at least in part on the second set of data having a second data size that is greater than or equal to the threshold size.

In some examples of the method 700 and the apparatus described herein, the portion of the second set of data may have a third data size that is equal to the threshold size.

Some examples of the method 700 and the apparatus described herein may further include operations, features, circuitry, logic, means, or instructions for invalidating the portion of the second set of data stored in the second buffer based at least in part on copying at least the portion of the second set of data to the first buffer.

In some examples of the method 700 and the apparatus described herein, the flushing the first set of data into the memory device may include operations, features, circuitry, logic, means, or instructions for writing the first set of data into the memory device at a multi-plane page offset of zero.

Some examples of the method 700 and the apparatus described herein may further include operations, features, circuitry, logic, means, or instructions for receiving a buffer flush command and flushing the second set of data into a temporary block of the memory device based at least in part on the buffer flush command.

In some examples of the method 700 and the apparatus described herein, the threshold size may be a product of a physical page size of the memory device and a quantity of planes of the memory device.

Some examples of the method 700 and the apparatus described herein may further include operations, features, circuitry, logic, means, or instructions for storing the data in a single buffer including the first buffer and the second buffer.

Some examples of the method 700 and the apparatus described herein may further include operations, features, circuitry, logic, means, or instructions for storing a first portion of the data in the first buffer and storing a second portion of the data in the second buffer separate from the first buffer.

In some examples of the method 700 and the apparatus described herein, a controller includes the first buffer and the second buffer.

In some examples of the method 700 and the apparatus described herein, the memory device includes a NAND memory device.

It should be noted that the methods described above describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

As used herein, the term "substantially" means that the modified characteristic (e.g., a verb or adjective modified by the term substantially) need not be absolute but is close enough to achieve the advantages of the characteristic.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope as disclosed herein. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or technologies such as infrared, radio, and microwave, then the coaxial cable, fiber optic cable, twisted pair, DSL, or technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A memory system, comprising:
one or more memory devices; and
processing circuitry coupled with the one or more memory devices and configured to cause the memory system to:
receive a command to write data to the one or more memory devices, the data having a data transfer size;
determine whether to add the data to a first buffer, a second buffer, or a combination thereof based at least in part on the data transfer size and a threshold size;
add the data to the first buffer, the second buffer, or the combination thereof based at least in part on the determining, the first buffer storing a first set of data and the second buffer storing a second set of data based at least in part on the adding; and
flush the first set of data into the one or more memory devices based at least in part on the first set of data satisfying a flush condition for the first buffer, wherein the processing circuitry is configured to cause the memory system to maintain the second set of data in the second buffer after flushing the first set of data into the one or more memory devices based at least in part on the flush condition for the first buffer.

2. The memory system of claim 1, wherein:
the processing circuitry configured to cause the memory system to determine whether to add the data to the first buffer, the second buffer, or the combination thereof is configured to cause the memory system to:
determine to add the data to the second buffer based at least in part on the data transfer size being less than the threshold size; and
the processing circuitry configured to cause the memory system to add the data to the first buffer, the second buffer, or the combination thereof is configured to cause the memory system to:
add the data to the second buffer based at least in part on the determining to add the data to the second buffer.

3. The memory system of claim 1, wherein:
the processing circuitry configured to cause the memory system to determine whether to add the data to the first buffer, the second buffer, or the combination thereof is configured to cause the memory system to:
identify one or more portions of the data based at least in part on the data transfer size being greater than or equal to the threshold size, each portion of the one or more portions having the threshold size; and
determine to add the one or more portions of the data to the first buffer based at least in part on each portion of the one or more portions having the threshold size; and
the processing circuitry configured to cause the memory system to add the data to the first buffer, the second buffer, or the combination thereof is configured to cause the memory system to:
add the one or more portions of the data to the first buffer based at least in part on the determining to add the one or more portions of the data to the first buffer.

4. The memory system of claim 3, wherein:
the data consists of the one or more portions and an additional portion, the additional portion having an additional portion size less than the threshold size;
the processing circuitry configured to cause the memory system to determine whether to add the data to the first buffer, the second buffer, or the combination thereof is further configured to cause the memory system to:
determine to add the additional portion of the data to the second buffer based at least in part on the additional portion size being less than the threshold size; and
the processing circuitry configured to cause the memory system to add the data to the first buffer, the second buffer, or the combination thereof is further configured to cause the memory system to:
add the additional portion of the data to the second buffer based at least in part on the determining to add the additional portion of the data to the second buffer.

5. The memory system of claim 1, wherein the processing circuitry is further configured to cause the memory system to:
copy at least a portion of the second set of data stored in the second buffer to the first buffer based at least in part on the second set of data satisfying a copy condition for the second buffer.

6. The memory system of claim 5, wherein the second set of data satisfies the copy condition for the second buffer based at least in part on the second set of data having a second data size that is greater than or equal to the threshold size.

7. The memory system of claim 6, wherein the portion of the second set of data has a third data size that is equal to the threshold size.

8. The memory system of claim 5, wherein the processing circuitry is further configured to cause the memory system to:
invalidate the portion of the second set of data stored in the second buffer based at least in part on copying at least the portion of the second set of data to the first buffer.

9. The memory system of claim 1, wherein the processing circuitry configured to cause the memory system to flush the first set of data into the one or more memory devices is configured to cause the memory system to:
write the first set of data into the one or more memory devices at a multi-plane page offset of zero.

10. The memory system of claim 1, wherein the processing circuitry is further configured to cause the memory system to:
receive a buffer flush command; and
flush the second set of data into a temporary block of the one or more memory devices based at least in part on the buffer flush command.

11. The memory system of claim 1, wherein the threshold size is a product of a physical page size of the one or more memory devices and a quantity of planes of the one or more memory devices.

12. The memory system of claim 1, wherein the processing circuitry is further configured to cause the memory system to:
store the data in a single buffer comprising the first buffer and the second buffer.

13. The memory system of claim 1, wherein the processing circuitry is further configured to cause the memory system to:
store a first portion of the data in the first buffer; and
store a second portion of the data in the second buffer separate from the first buffer.

14. The memory system of claim 1, wherein the processing circuitry comprises the first buffer and the second buffer.

15. The memory system of claim 1, wherein the one or more memory devices comprises a not-and memory device.

16. A non-transitory computer-readable medium storing code comprising instructions which, when executed by processing circuitry of a memory system, cause the memory system to:
- receive a command to write data to one or more memory devices, the data having a data transfer size;
- determine whether to add the data to a first buffer, a second buffer, or a combination thereof based at least in part on the data transfer size and a threshold size;
- add the data to the first buffer, the second buffer, or the combination thereof based at least in part on the determining, the first buffer storing a first set of data and the second buffer storing a second set of data based at least in part on the adding; and
- flush the first set of data into the one or more memory device based at least in part on the first set of data satisfying a flush condition for the first buffer, wherein the instructions, when executed by the processing circuitry of the memory system, cause the memory system to maintain the second set of data in the second buffer after flushing the first set of data into the one or more memory devices based at least in part on the flush condition for the first buffer.

17. The non-transitory computer-readable medium of claim 16, wherein the instructions, when executed by the processing circuitry of the memory system, further cause the memory system to:
- copy at least a portion of the second set of data stored in the second buffer to the first buffer based at least in part on the second set of data satisfying a copy condition for the second buffer.

18. The non-transitory computer-readable medium of claim 17, wherein the instructions, when executed by the processing circuitry of the memory system, further cause the memory system to:
- invalidate the portion of the second set of data stored in the second buffer based at least in part on copying at least the portion of the second set of data to the first buffer.

19. A method performed by a memory system, comprising:
- receiving a command to write data to one or more memory device of the memory system, the data having a data transfer size;
- determining whether to add the data to a first buffer, a second buffer, or a combination thereof based at least in part on the data transfer size and a threshold size;
- adding the data to the first buffer, the second buffer, or the combination thereof based at least in part on the determining, the first buffer storing a first set of data and the second buffer storing a second set of data based at least in part on the adding; and
- flushing the first set of data into the one or more memory devices based at least in part on the first set of data satisfying a flush condition for the first buffer, wherein the second set of data is maintained in the second buffer after flushing the first set of data into the one or more memory devices based at least in part on the flush condition for the first buffer.

20. The memory system of claim 1, wherein the first buffer comprises one or more first volatile memory cells of the processing circuitry configured to store data for flushing into one or more non-volatile memory cells of the one or more memory devices, and wherein the second buffer comprises one or more second volatile memory cells different than the one or more first volatile memory cells and configured to temporarily store data for copying into the first buffer.

* * * * *